United States Patent [19]
Toback

[11] 3,863,775
[45] Feb. 4, 1975

[54] METHOD AND APPARATUS FOR INVERTING OPERATIONS ASSOCIATED WITH THE ASSEMBLY OF A STORAGE BATTERY

[75] Inventor: Henry Toback, New Ringgold, Pa.
[73] Assignee: General Battery Corporation, Reading, Pa.
[22] Filed: Nov. 9, 1973
[21] Appl. No.: 414,520

[52] U.S. Cl. ............... 214/1 QE, 214/148, 214/152
[51] Int. Cl. ............................................ B65g 7/00
[58] Field of Search.... 214/1 Q, 1 QA, 1 QD, 1 QF, 214/130 R, 146.5, 148, 152; 254/94

[56] References Cited
UNITED STATES PATENTS

| 177,949 | 5/1876 | McKinney | 214/1 D X |
| 1,914,656 | 6/1933 | Walker | 214/1 QE X |
| 2,553,283 | 5/1951 | Stratton | 214/1 QE |
| 2,862,629 | 12/1958 | Aberle | 214/1 QF |
| 3,314,554 | 4/1967 | Cuniberti | 214/1 Q |

*Primary Examiner*—Frank E. Werner
*Attorney, Agent, or Firm*—Paul & Paul

[57] ABSTRACT

A method and apparatus of the battery engaging type is provided to facilitate manual inverting of an electrical storage battery, or components thereof, as is normally required during assembly thereof.

12 Claims, 4 Drawing Figures

PATENTED FEB 4 1975

METHOD AND APPARATUS FOR INVERTING OPERATIONS ASSOCIATED WITH THE ASSEMBLY OF A STORAGE BATTERY

BACKGROUND OF THE INVENTION

This invention pertains to the art of assembling an electrical battery and more specifically to the assembly of a special purpose, limited production storage battery generally of the lead acid type. While it has become common to adapt various automated techniques and apparatus to the assembly of storage batteries, generally such innovations are implimented only in the assembly of general purpose, mass-produced storage batteries. In the assembly of heavy duty and special purpose storage batteries, especially those which are produced in limited quantities, automation is much more limited, and manual techniques and procedures continue in use throughout the industry.

At various stages in the manufacture of a storage battery, it is necessary to invert the partially assembled battery, or various components thereof. For example, it is usually necessary to invert the lead-containing battery casing component and fit it onto an inverted lid component which has adhesive applied thereto, so as to join the components without seepage or dripping of any adhesive into the battery cells. It is to be understood that the scope of this invention is not limited solely to this particular inverting operation, but rather encompasses any inverting operation which may be required in the assembly of a storage battery.

In the art of manufacture and assembly of special purpose and limited production storage batteries, it has generally been the practice to perform these inverting operations through the use of manual labor. Typically, more than one worker would be required to physically grasp, manually lift and then rotate a battery casing component, so as to invert and align it properly over a lid component onto which it is thereafter lowered. This is a particularly time consuming and often difficult task, in light of the fact that the component being inverted can weight as much as 80 pounds or more.

SUMMARY OF THE INVENTION

The present invention is directed toward providing a simple and more efficient method for inverting a storage battery, or components thereof, during the battery assembly process. More specifically, the invention facilitates manual performance of battery inverting operations, so as to require less manpower and minimal capital expenditure in the assembly of storage batteries, especially those of the special purpose and limited production type.

Accordingly, it is a primary object of this invention to provide a novel method and apparatus for inverting a storage battery during the assembly thereof. It is to be understood, for purposes of this application, that reference to a storage battery encompasses not only the completed object, but also any partially constructed battery, or component thereof.

It is a further object of this invention to provide a method and apparatus for inverting a storage battery which is adapted for manual operation.

It is a further object of this invention to accomplish the objects set forth immediately above, using only a minimum work force.

It is a further object of this invention to provide an inexpensive apparatus for inverting a storage battery, which is both durable and easy to use.

It is yet a further object of this invention to provide a method for inverting a storage battery during its assembly, whereby the operation may be performed more efficiently, more economically, and more easily.

Other objects and advantages of the present invention will be readily apparent to those skilled in the art from a reading of the following brief description of the drawings, detailed description of the preferred embodiment, and the appended claims.

DESCRIPTION OF THE PREFERRED EMBODIMENT

Figure 1:
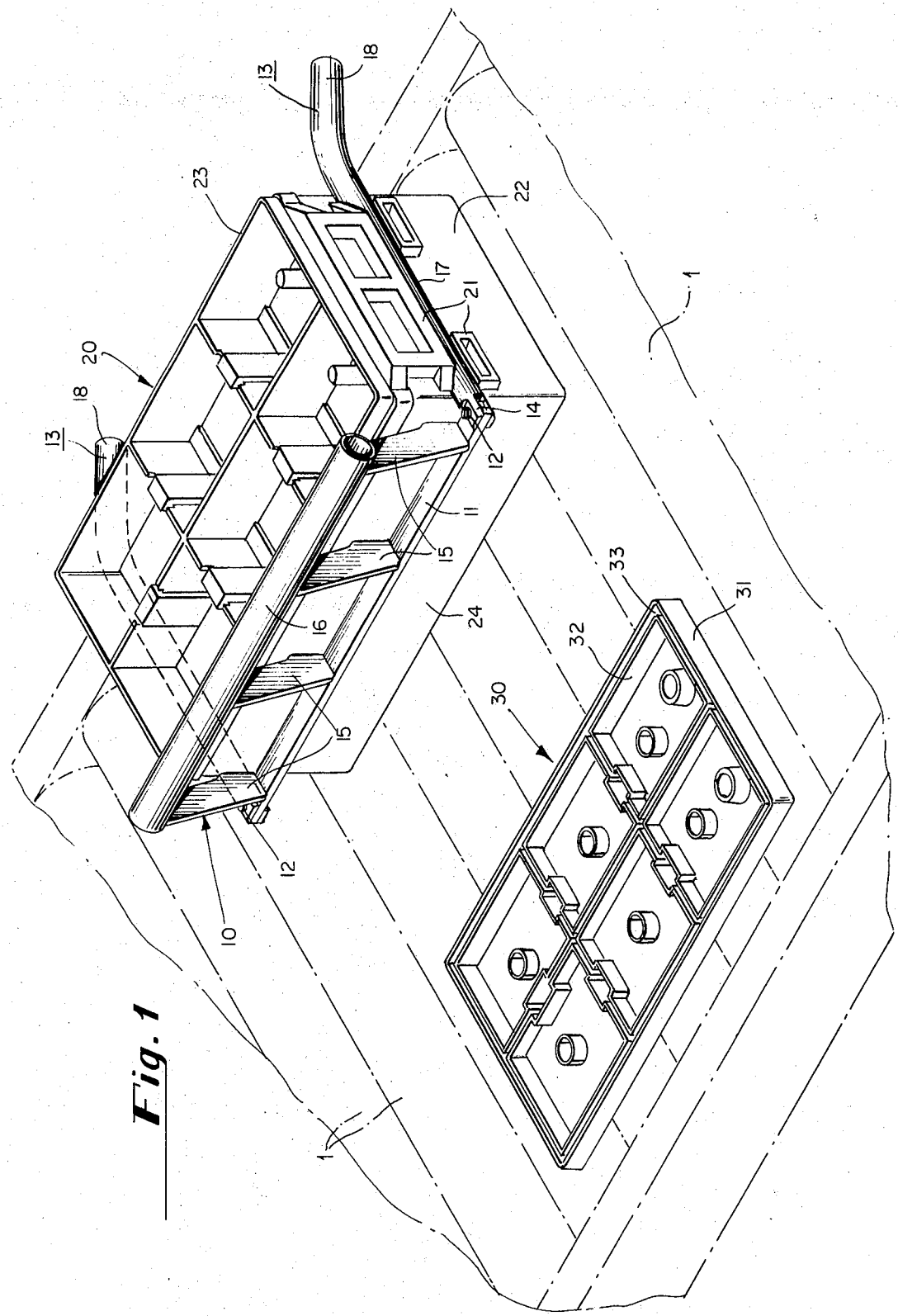
FIG. 1 is a perspective view showing an apparatus in accordance with the present invention in lifting engagement of a battery casing component positioned on a conveyor next to a lid component onto which it is to be inverted.

Referring now to the drawings in detail, reference is first made to FIG. 1, wherein the battery inverting apparatus of the invention is generally designated by the numeral 10 and is shown in lifting engagement of battery casing 20 which is positioned on roller conveyor 1 next to lid component 30, upon which casing 20 is to be inverted.

Battery inverting apparatus 10 is comprised of a generally elongated, rectangular base member 11, of metal, plastic or like construction that is suitable to provide a rigid base. Base member 11 is provided to be of sufficient length greater than side 24 of battery 20 to extend beyond opposite ends 22. A pair of cylindrical handle means 13, each having a notched end 14 configured for pivotal mounting, are pivotally mounted on the spaced-apart ends of base member 11 by nut-and-bolt pivot means 12 configured for allowance of pivotal movement. The medial portion 17 of handle means 13 is generally straight and distal end 18 of handle means 13 is angularly disposed in relation to medial portion 17 to facilitate upward manual lifting. A roll-over support means 16 of the tubular type is associated with and rigidly connected parallel to base member 11 by a plurality of support sturts 15 perpendicularly disposed therebetween. While roll-over support means 16 of the preferred embodiment is attached to base member 11, it will be readily appreciated by those skilled in the art that roll-over means 16 could be provided as a part of the base of the apparatus, which could be configured and formed so as to provide a suitable roll-over support means. It is therefore, specifically within the purview of the present invention that a suitable roll-over support means could be provided in association with the base either as part of thereof, or as separate means rigidly connected thereto.

Battery casing 20 is shown in FIG. 1 as the component to be inverted onto lid component 30 using the method and apparatus of the present invention. Battery casing 20 has a plurality of structural elements 21 protruding outwardly from the exterior of ends 22. As is shown in the drawings, medial portion 17 of handle means 13 may be fitted against external ends 22 of battery casing 20 in the recessed channels formed between structural members 21, thereby facilitating lifting engagement of battery casing 20. It should be noted, however, that in the practice of the present invention, lifting engagement of the battery component to be inverted by the handle means may be accomplished in any manner whereby the battery component is firmly engaged for lifting between a pair of handle means in accordance with the invention. For example, such lifting engagement could be achieved solely by applying and maintaining a sufficient force on the handle means 13 having battery casing 20 therebetween, so as to urge them together. Similarly, handle means 13 could be provided with medial portion 17 having a roughened surface, serrations, or the like, to facilitate engagement of a battery casing 20 having substantially planar ends 22 not having recessed channels formed therein.

Lid component 30 is shown in position to receive battery casing 20 after the latter is inverted. Lid component 30 is provided with an outer edge 31 and a plurality of inner edges 32 between which is formed a channel 33 configured for receiving the upper edge 23 of battery casing 20 as it is inverted and fitted thereinto by practice of the present invention.

Figure 2:
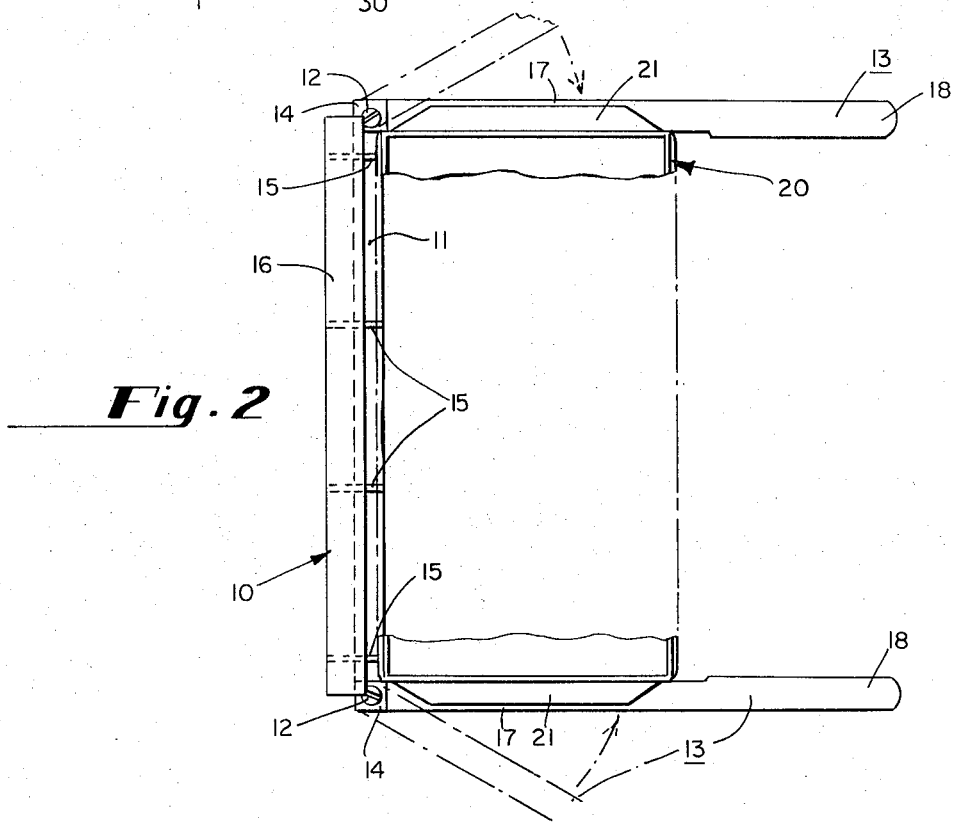
FIG. 2 is a top view of an apparatus in accordance with this invention shown in lifting engagement of a battery.

FIG. 2 is a top view of an apparatus of the present invention showing the pivotal movement of the pair of handle means 13 toward each other relative to base member 11, so as to firmly engage battery casing 20 therebetween. Of course, pivotal movement of the pair of handle means 13 away from each other in relation to base 11 will allow disengagement of apparatus 10 from battery casing 20.

Figure 3:
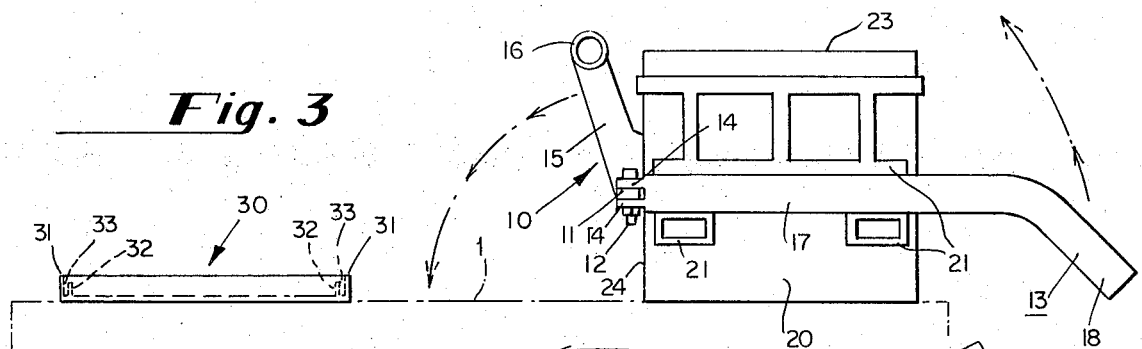
FIG. 3 and FIG. 4 are sequential elevational end views of an apparatus in accordance with this invention adapted in lifting engagement of a battery casing component and showing the method whereby the battery casing component is inverted onto its lid component.
Figure 4:
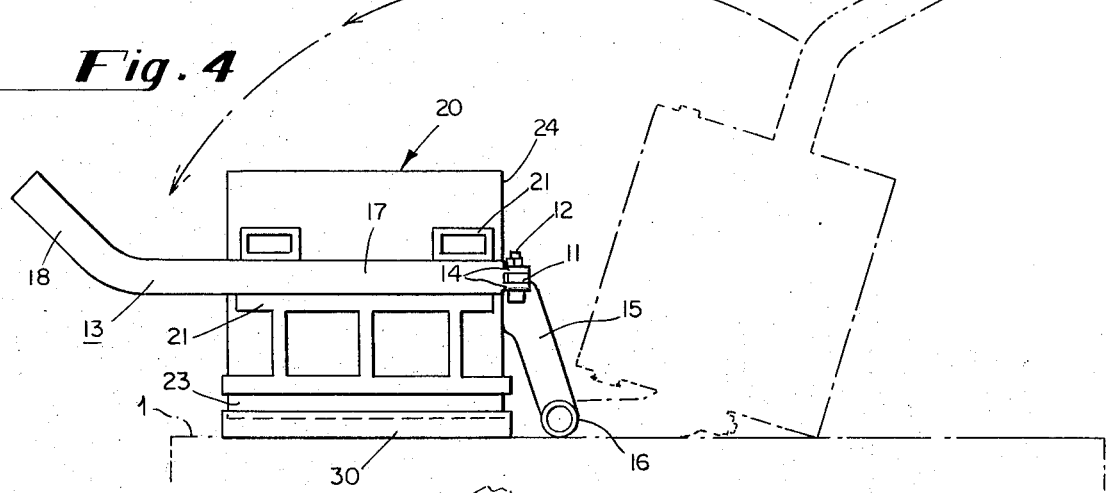

FIG. 3 and FIG. 4 illustrate the operation of battery inverting apparatus 10 to invert battery casing 20 into lid component 30. In FIG. 3, apparatus 10 is placed in contact with battery casing 20 so the base member 11 extends generally along one side of battery casing 20 and handle means 13 are positioned for lifting engagement of battery casing 20 therebetween. As sufficient force is applied and maintained to urge movement of handle means 13 toward each other relative to base member 11, handle means 13 are simultaneously, manually and upwardly lifted in relation to the side of battery casing 20, so as to bring roll-over support means 16 into contact with supporting surface 1 in a suitable position in relation to lid component 30 for subsequent inverting of battery casing 20 thereupon.

FIG. 4 shows roll-over support means 16 in contact with supporting surface 1 and illustrates that upon continued application of an upward, lifting force on handle means 13 in relation to battery casing 20, it will be rotated between approximately 90° to 180° about the supporting axis provided by roll-over support means 16, and battery casing 20 will be completely inverted from its original unengaged position on supporting surface 1 so that upper wall edges 23 are fitted into receiving channel 33 of lid component 30. As it is fully within the purview of this invention that apparatus 10 could be provided in various different configurations in accordance therewith, it will be readily apparent to those skilled in the art that depending upon the particular arrangement of the apparatus components, especially the exact positioning of the roll-over support means, rotation about the supporting axis could be as much as 180°, although the amount of rotation is not limiting in any way to the practice of the invention.

After battery casing 20 is inverted upon lid component 30, battery inverting apparatus 10 is disengaged and removed therefrom by moving handle means 13 away from each other relative to base 11.

It will be readily apparent to those skilled in the art that various modifications may be made in the details of construction, as well as the use and operation of a battery inverting apparatus of this invention, all with the spirit and scope of the invention as recited in the appended claims. For example, components of the apparatus could be hollow or solid, cylindrical or polygonal, and could be formed in any suitable shape or size in accordance with the invention.

Furthermore, while a battery engaged by apparatus of the preferred embodiment of the invention, as herein disclosed, will be rotated through a substantial arc prior to roll-over support means 16 being engaged with said supporting surface for roll over of the battery, it is fully within the purview of the invention that alternative construction of roll-over support means 16, or base member 11, could result in facilitating roll-over upon initial upward lifting of handle means 13.

What is claimed is:

1. Apparatus for use in inverting operations associated with the assembly of a storage battery, comprising:
   a. a rigid base having spaced-apart ends;
   b. a pair of handle means pivotally connected to said base so as to be capable of movement toward and away from each other relative to said base and configured for lifting engagement of said battery therebetween; and
   c. roll-over support means rigidly associated with said base adapted for providing a supporting axis about which said battery, upon engagement by and upward lifting of said handle means, can be rolled over and rotated as much as 180°, whereby said battery is inverted from its original unengaged position.

2. Apparatus of claim 1, wherein said roll-over support means is an integral part of said base.

3. Apparatus of claim 1, wherein said roll-over support means is a separate means rigidly connected to said base.

4. Apparatus of claim 3, wherein said roll-over support means is connected to said base by a plurality of supporting struts.

5. Apparatus of claim 3, wherein said roll-over support means is of the tubular type.

6. Apparatus of claim 1, wherein said base consists of a generally elongated rectangular member having spaced-apart ends, said spaced-apart ends being adapted to facilitate pivotal mounting of said handle means.

7. Apparatus of claim 1, wherein said handle means are of the cylindrical type adapted for upward lifting when positioned for lifting engagement of said battery.

8. Apparatus of claim 1, wherein said handle means are configured to fit into recessed channels formed in opposite sides of said battery, whereby said battery can be engaged for lifting by said handle means.

9. Apparatus of claim 1, wherein said handle means each have a notched end configured for pivotal mounting onto said base.

10. Apparatus of claim 1, wherein said handle means are pivotally mounted at said notched ends to said spaced-apart ends of said base by pivot means configured for allowance of pivotal movement.

11. A method for inverting a storage battery during the assembly thereof, comprising:
  a. providing battery inverting apparatus having a rigid base, a pair of handle means pivotally connected at one end to said base so as to be capable of movement toward and away from each other relative to said base, and a roll-over support means associated with or comprising part of said base for providing a supporting axis about which said apparatus can be rolled over;
  b. placing said apparatus in contact with said battery resting on a suitable supporting surface so that said base generally extends along one side of said battery and said handle means are positioned for lifting engagement of said battery;
  c. applying and maintaining sufficient force to said handle means so as to urge movement toward each other relative to said base, whereby said battery is engaged for lifting;
  d. manually, upwardly lifting said handle means in engagement with said battery, so as to bring said roll-over support means into contact with said supporting surface to thereby provide said supporting axis and rotate said engaged battery as much as 180° about said supporting axis to thereby cause said battery to be inverted from its original unengaged position;
  e. moving said handle means away from each other relative to said base, whereby said apparatus is disengaged from said battery; and
  f. removing said apparatus from contact with said battery.

12. Apparatus for use in inverting operations associated with the assembly of a storage battery, comprising:
  a. a rigid, elongated, rectangular base member having spaced-apart ends adapted to facilitate pivotal mounting, said spaced-apart ends being configured to extend beyond the opposite ends of said battery when said apparatus is placed in lifting engagement therewith;
  b. a pair of cylindrical handle means each having a notched end configured for pivotal mounting, a generally straight medial portion configured to fit into recessed channels formed in opposite ends of said battery for lifting engagement thereof, and a distal end angularly disposed in relation to said medial portion to facilitate upward manual lifting, said handle means being pivotally connected at said notched ends to said spaced-apart ends of said base member by nut-and-bolt pivot means, so as to be capable of movement toward and away from each other relative to said base member; and
  c. a roll-over support means of the tubular type, rigidly connected parallel to said base member by a plurality of supporting struts perpendicularly disposed therebetween, for providing suitable supporting axis about which said battery, upon engagement by and upward lifting of said handle menas in relation to the sides of said battery so engaged, can be rolled over and rotated as much as 180°, whereby said battery is inverted from its original unengaged position.

* * * * *